United States Patent Office 2,903,468
Patented Sept. 8, 1959

2,903,468

PROCESS OF HYDROGENATING GLYCERIDES

Dwight R. Merker, Chicago, Ill., assignor to Swift & Company, Chicago, Ill., a corporation of Illinois No Drawing. Application February 18, 1957
Serial No. 640,605

6 Claims. (Cl. 260—409)

This invention relates generally to a process for treating oils and, more particularly, to a process for hydrogenating vegetable and animal oils to produce a partially hardened fat having a wider range of plasticity and improved flavor stability.

Heretofore, in the manufacture of margarine and shortening it has been a practice to blend soft oils, which have been hydrogenated under selective conditions, with fatty materials containing more fully saturated glycerides. By "selective conditions" is meant that the hydrogenation reaction is carried out under conditions calculated to effect the addition of hydrogen to fatty acid radicals containing more unsaturation in preference to the less unsaturated radicals. Expressed in another way, as selectivity is increased, the tendency for those radicals containing a greater number of active methylene groups to add hydrogen will increase.

It is an object of this invention to provide a method for preparing a non-blended partially hardened fat characterized by a wide range of plasticity.

Another object of the present invention is to provide a method for producing a partially hardened fat suitable for margarine manufacture by non-selective hydrogenation conditions. Fats prepared in this manner are particularly well adapted to the manufacture of margarine or shortening without the necessity of blending.

Still another object is the provision of a method for producing a hydrogenated fat of improved flavor stability toward reversion.

Additional objects, if not specifically set forth herein, will be readily apparent to one skilled in the art from the following detailed description of the invention.

In accordance with the process of the present invention a small amount of a natural phosphatidic non-selectivity promoter material is added to a hydrogenation mixture prior to hydrogenation to produce a partially hardened fat having an improved range of plasticity, superior flavor stability and a greater hardness for a given iodine value. A substantial advantage in the use of the natural phosphatides for this purpose lies in the fact that the hardness and plastic range of the product can be closely controlled since these characteristics have been found to depend on the amount and distribution of the promoter material added to the charge prior to hydrogenation.

More specifically, the method of the present invention comprises adding a small amount of a natural phosphatide to a glyceride oil or mixtures thereof, and hydrogenating the mixture at conventional hydrogenation temperature and pressure to produce partially hardened fats having the desirable wide plastic range. The promoter materials of this invention, referred to as natural phosphatides, are best exemplified by, although not limited to, "commercial lecithin" compositions which are available from various vegetable oil processors. The commercial product contains about 65 parts phospholipids and about 35 parts oil which remains with the phosphatides in separating them from the vegetable oil from which they are derived. The specifications for various grades of "commercial lecithin" call for a phosphorus content around 2.0–2.2% and 60–65% of acetone insoluble material. The phospholipid component of commercial lecithin is a complex mixture of lecithin, cephalin and inositol phosphatides.

The commercial lecithin promoter agent has a marked effect on the course of hydrogenation of the oil to which it is added. Trace amounts of the promoter are effective in enhancing flavor stability, whereas greater amounts, up to around 1.0% of the promoter, may be necessary to obtain a particular desired range of plasticity and hardness. Inasmuch as the hardness and breadth of the plastic range varies with the concentration and distribution of the promoter, the amount added will be determined by the desired consistency in the final product. Distribution of the promoter may be controlled by the use of various inactive adsorbents. The direct relationship between consistency of the hydrogenated product and the concentration and distribution of the promoter affords a very desirable adjustable method for preparing fats of predetermined consistency.

Although commercial vegetable lecithin compositions have previously been employed in the deodorization stage in the refining operation to improve the oxidative stability of edible oils, it has been the custom heretofore to remove naturally-occurring phosphatides, along with gums, free fatty acids, etc., from the oil by degumming and refining prior to hydrogenation, since these materials are deemed to be catalyst poisons. Crude soybean oil is known to contain as much as 2% phosphatides and crude cottonseed oil around 0.5% to 0.9% phosphatides. According to the present invention, however, the presence of predetermined amounts of these naturally-occurring phosphatides during hydrogenation is necessary for the production of fats of improved flavor stability and permits alteration of the course of the hydrogenation reaction as desired. The improvement in flavor stability which is realized in fats treated in accordance with the method of this invention is an improved resistance toward reversion rather than a resistance to rancidity development. The distinction between flavor deterioration due to rancidity and true flavor reversion is well known in the art. Oils which are rancid exhibit a characteristic flavor, and various different types of rancid fats all taste substantially the same. In the case of flavor reversion, however, a characteristic flavor for each type of oil is noted. Reverted soybean oil, for instance, has an objectionable "beany" or "grassy" flavor.

As the selectivity of hydrogenation is decreased, the percentage of polyunsaturated acids at a given iodine value increases. Since oxidative stability is directly related to polyunsaturate content, it would be expected that, as selectivity decreases, the flavor stability of the oil would decrease. Oils non-selectively hydrogenated in accordance with this invention are characterized by an improved resistance to flavor reversion however.

As has been noted above, the presence of small amounts of added natural phosphatides in an oil alters the course of the hydrogenation reaction, causing hydrogen to add in a non-selective manner. As distinguished from selectively hydrogenated materials, the products of this invention contain considerably larger amounts of saturated glycerides and a higher percentage of polyunsaturated glycerides. It is this combination of saturated and unsaturated glycerides which provides the desirable improved plastic range. The percentage increase in polyunsaturates remaining in an oil hydrogenated in accordance with this invention is evident from the table which follows. While the iodine value of the oils hydrogenated in the presence of the lecithin promoter varies only slightly from that of the control sample, the values for the polyunsaturated glycerides are higher. The hardness, as represented by the softening point, Wiley melting point, and setting point, is significantly greater than the control sample. In addition, a striking difference in plastic ranges, as measured by the solid content index, is readily discernible.

A very small quantity of the lecithin promoter is effective in producing a noticeable improvement in flavor stability, although the preferred range for altering the selectivity is about 0.05 to 1.0%, based on the weight of the oil charge. Larger amounts are also effective, although the amount of the promoter employed will be determined largely by the consistency and hardness desired in the final product.

Typical "commercial lecithin" products available from various vegetable oil processors are composed of a complex mixture of phosphatides and vegetable oil. The lecithin is derived from soybean or other vegetable oils by degumming or other methods, and a portion of the oil remains with the phosphatidic material even after separation from the bulk of the oil. The phosphatidic portion contains cephalin and inositol phosphatides in addition to lecithin. Since commercial lecithin is a well known food additive, there is no objection to its presence in the hardened fat, although most of the residual lecithin after hydrogenation will be removed in the filtration step.

The following example will serve to more clearly illustrate the process of this invention.

EXAMPLE I

An oil charge of 3000 grams of a blend of refined soybean oil (80%) and refined cottonseed oil (20%) was placed in a hydrogenator. Six grams of "commercial lecithin" was added to the oil charge and the mixture agitated for several minutes. An adsorbent composition containing 0.1% carbon and 0.1% dicalite was added to the mixture, which was heated to around 135° C. after evacuation of the reaction vessel. 0.1% nickel catalyst was then added, and the charge heated to about 180°–200° C. After forty minutes' reaction time with gaseous hydrogen at 20 p.s.i. pressure, the iodine value of the hydrogenated oil was 76.9. Another 3000 gram batch of refined oil containing 4.5 grams of "lecithin" and a control sample which contained no promoter agent were hydrogenated under identical conditions to approximately the same iodine values. The oils were bleached in the conventional manner at 110° C. for 15 minutes with acidulated earth, filtered and deodorized. The change in plastic range of the products as shown by melting point, solids content index, and polyunsaturates resulting from runs employing different concentrations of added lecithin is shown in Table I.

*Table I*

EFFECT OF COMMERCIAL LECITHIN ON THE HYDROGENATION OF SOYBEAN OIL (80%), COTTONSEED OIL (20%) BLEND

|  | Control | Commercial Lecithin Added | |
|---|---|---|---|
|  |  | 0.15% | 0.20% |
| Iodine Value | 76.3 | 77.5 | 76.9 |
| Softening Point, ° F | 81 | 95 | 97 |
| Wiley, ° F | 92 | 98 | 100 |
| Melting Point, ° F | 94 | 101 | 105 |
| Setting Point, ° C | 26.4 | 28.6 | 29.4 |
| Solid Content Index: |  |  |  |
| 50° F | 23.8 | 25.8 | 26.6 |
| 70° F | 12.2 | 15.9 | 16.2 |
| 80° F | 6.8 | 10.9 | 12.2 |
| 92° F | 1.1 | 3.5 | 5.4 |
| 100° F | 0.0 | 0.6 | 2.0 |
| Percent Linoleic Acid | 6.0 | 7.1 | 7.1 |
| Percent Linolenic Acid | 0.1 | 0.1 | 0.26 |

From the data reported in the above table it can be seen that a method is disclosed herein by which hardness and breadth of plastic range of any fatty material can be adjusted within predetermined limits merely by altering the concentration or distribution of the lecithin promoter employed in the hydrogenation reaction. For any given iodine value a fat of increased hardness, higher melting point and a broader range of plasticity may be prepared. The percentage of polyunsaturation also increases as the amount of promoter employed is increased. It is possible, therefore, to simulate blended oil, such as is used in margarine and liquid shortening manufacture, by a one-step hydrogenation method.

The hydrogenation process may be carried out in the usual manner using any of the well known metallic hydrogenation catalysts such as finely-divided nickel or nickel-copper. Although in the example disclosed herein only refined soybean and cottonseed oil have been subjected to controlled non-selective hydrogenation conditions, any of the numerous animal or vegetable glyceride materials known to the art may be treated in this manner.

The amount and type of catalyst is also subject to variations since Raney nickel and other equivalent types of catalysts may be employed. The amount of catalyst also may be varied up to as much as 0.4%, based on the weight of the oil. In order to obtain a given result in the hydrogenation, however, the use of larger amounts of catalyst will require that correspondingly larger amounts of the promoter be employed in order to maintain a constant catalyst-promoter ratio. In any event, a non-selective hydrogenation carried out in accordance with the present method will produce an oil having a higher melting point and a wider plastic range for a given iodine value than an oil hydrogenated to the same iodine value in the absence of the lecithin promoter. An oil which has been hydrogenated in the presence of trace amounts of lecithin and then deodorized, retains good flavor and odor undiminished for a long period of time. Even upon long standing, the odor and flavor which develop are typical of rancidity rather than reversion.

Obviously, many modifications of the invention hereinbefore set forth may be made without departing from the spirit and scope thereof, and therefore only such limitations should be imposed as are indicated in the appended claims.

I claim:

1. A method of producing a partially hardened hydrogenated refined fat having an improved range of plasticity and flavor stability which comprises: incorporating in said refined fat, prior to hydrogenation, a predetermined small amount of at least about 0.05% of a naturally-occurring vegetable phospholipid.

2. A method for controlling the hardness and plastic range for a given iodine value of a fatty material which comprises: catalytically hydrogenating a normally refined liquid glyceride oil in the presence of an added predetermined small amount of at least about 0.05% of a non-selectivity promoter, said promoter being a vegetable phosphatide composition.

3. A method of producing a partially hardened fat of improved flavor stability and plastic range from a refined normally liquid glyceride oil which comprises: catalytically hydrogenating said glyceride oil in the presence of about 0.05% to 1.0% of a promoter composition containing vegetable phosphatides as the active ingredients.

4. A method of producing an oil of improved flavor stability which comprises: catalytically hydrogenating a refined normally liquid glyceride oil in the presence of about 0.05% to 0.4% of a promoter composition containing vegetable phosphatides as the active ingredients.

5. A process for hydrogenating refined vegetable oil to produce a partially hardened fat having improved plastic range and improved flavor stability, comprising: adding a predetermined small amount of at least about 0.05% based on the weight of said oil, of lecithin to said oil and catalytically hydrogenating said oil under hydrogenation conditions whereby to produce a wide plastic range hydrogenated product having an iodine value varying only slightly from a control sample.

6. A process for producing a partially hardened fat of improved flavor stability and plastic range comprising: catalytically hydrogenating a blend of refined soybean oil and cottonseed oil in the presence of an added amount about 0.05% to 1.0% of a promoter composition containing vegetable phosphatides as the active ingredient.

References Cited in the file of this patent

Markley: Soybeans and Soybean Products, vol. II, 695 (1951), Interscience Publishers, Inc., New York.

Bailey: Industrial Oil & Fat Products, p. 716 (1951), Interscience Publishers, New York.